(12) United States Patent
Hori

(10) Patent No.: US 10,033,454 B2
(45) Date of Patent: Jul. 24, 2018

(54) COMMUNICATION PATH CONTROL DEVICE, COMMUNICATION PATH CONTROL SYSTEM, COMMUNICATION PATH CONTROL METHOD AND COMMUNICATION PATH CONTROL PROGRAM

(71) Applicant: NEC Platforms, Ltd., Kawasaki-shi, Kanagawa (JP)

(72) Inventor: Takeshi Hori, Kanagawa (JP)

(73) Assignee: NEC PLATFORMS, LTD., Kanagawa (JP)

( * ) Notice: Subject to any disclaimer, the term of this patent is extended or adjusted under 35 U.S.C. 154(b) by 0 days.

(21) Appl. No.: 15/305,747

(22) PCT Filed: Mar. 1, 2016

(86) PCT No.: PCT/JP2016/056180
§ 371 (c)(1),
(2) Date: Oct. 21, 2016

(87) PCT Pub. No.: WO2016/181686
PCT Pub. Date: Nov. 17, 2016

(65) Prior Publication Data
US 2017/0149487 A1  May 25, 2017

(30) Foreign Application Priority Data

May 13, 2015  (JP) .................................. 2015-097964

(51) Int. Cl.
*H04B 7/14*  (2006.01)
*H04L 29/06*  (2006.01)
(Continued)

(52) U.S. Cl.
CPC ............. *H04B 7/14* (2013.01); *H04L 61/256* (2013.01); *H04L 65/1006* (2013.01); *H04W 4/16* (2013.01)

(58) Field of Classification Search
CPC ..... H04B 7/14; H04L 61/256; H04L 65/1006; H04W 4/16
(Continued)

(56) References Cited

U.S. PATENT DOCUMENTS

| 7,797,433 B2 | 9/2010 | Kennedy et al. |
| 2005/0044247 A1 | 2/2005 | Bar-Zakai |

(Continued)

FOREIGN PATENT DOCUMENTS

| EP | 2056574 A1 | 5/2009 |
| JP | 2003-258836 A | 9/2003 |

(Continued)

OTHER PUBLICATIONS

"Technical Trends in P2PSIP, and Approach to NAT Traversal Problems", Ichiro Yamaguchi et al., NEC System Platforms Research Laboratories, May 30, 2007.

(Continued)

*Primary Examiner* — Obaidul Huq

(57) ABSTRACT

To perform communication with a communication path not unnecessarily going through a relay device such as a router. Under an environment in which a first network and a second network are connecting via a relay device, in a case of information used for establishing of a communication path between a call-origin terminal and a call-destination terminal sent by one among the call-origin terminal and the call-destination terminal to the other thereof, being forwarded from the relay device, contents of the information used for establishing of the communication path are overwritten so that the communication path between the call- (Continued)

source terminal and call-destination terminal is established with a path not going through the relay device, and the information thus overwritten is sent to the other one among the call-origin terminal and the call-destination terminal, if both of the network in which the call-origin terminal is installed and the network in which the call-destination terminal is installed are the first network.

10 Claims, 9 Drawing Sheets

(51) Int. Cl.
*H04W 4/16* (2009.01)
*H04L 29/12* (2006.01)
(58) Field of Classification Search
USPC ................................................ 370/229, 235
See application file for complete search history.

(56) References Cited

U.S. PATENT DOCUMENTS

2007/0097990 A1    5/2007    Ozaki et al.
2010/0191829 A1*   7/2010    Cagenius ............ H04L 12/2834
                                                          709/219
2010/0284288 A1*  11/2010    Lee .................... H04L 63/1416
                                                          370/252

FOREIGN PATENT DOCUMENTS

| JP | 2005-072817 A | 3/2005 |
| JP | 2008-172552 A | 7/2008 |
| JP | 2008-258917 A | 10/2008 |
| JP | 2010-239516 A | 10/2010 |
| JP | 2013-110626 A | 6/2013 |
| JP | 5988407 B1 | 9/2016 |

OTHER PUBLICATIONS

[PBX] Does anyone know if FreeSwitch wil do Far-end NAT Traversa, Sep. 2012. URL: http://www.dslreports.com/forum/r27518963-PBX-Does-anyone-know-if-FreeSwitch-wil-do-Far-end-NAT-Traversa.
Japanese Office Action for JP Application No. 2015-097964 dated Feb. 5, 2016 with English Translation.
Japanese Office Action for JP Application No. 2015-097964 dated Apr. 26, 2016 with English Translation.
JPO Decision to Grant a Patent for JP Application No. 2015-097964 dated Jul. 12, 2016.
Extended European Search Report for EP Application No. EP16784122.0 dated Mar. 17, 2017.

* cited by examiner

TABLE 1:STATIC NAPT TABLE

| RECEIVING PORT | FORWARDING-DESTINATION IP ADDRESS | FORWARDING-DESTINATION PORT NUMBER |
|---|---|---|
| 5060 | 172.16.0.10 | 5060 |

FIG. 3

TABLE 2 : TERMINAL POSITION MANAGEMENT TABLE(CALL THROUGH NAT)

|  | FIRST PHONE TERMINAL | SECOND PHONE TERMINAL | THIRD PHONE TERMINAL |
|---|---|---|---|
| EXTENSION LINE NUMBER | 100 | 101 | 200 |
| IP HEADER<br>IP ADDRESS | 172.16.0.100 |  | 172.16.0.254 |
| SIP CONTACT HEADER<br>IP ADDRESS | 10.0.0.10 |  | 10.0.0.100 |

FIG. 5

TABLE 3:TERMINAL POSITION MANAGEMENT TABLE(CALL OF LOCAL NETWORK)

| | FIRST PHONE TERMINAL | SECOND PHONE TERMINAL | THIRD PHONE TERMINAL |
|---|---|---|---|
| EXTENSION LINE NUMBER | 100 | 101 | 200 |
| IP HEADER IP ADDRESS | 172.16.0.100 | 172.16.0.101 | |
| SIP CONTACT HEADER IP ADDRESS | 10.0.0.10 | 10.0.0.10 | |

FIG. 7

COMMUNICATION PATH CONTROL DEVICE, COMMUNICATION PATH CONTROL SYSTEM, COMMUNICATION PATH CONTROL METHOD AND COMMUNICATION PATH CONTROL PROGRAM

This application is a National Stage Entry of PCT/JP2016/056180 filed on Mar. 1, 2016, which claims priority from Japanese Patent Application 2015-097964 filed on May 13, 2015, the contents of all which are incorporated herein by reference, in their entirety.

TECHNICAL FIELD

The present invention relates to a communication path control device, communication path control system, communication path control method and communication path control program, which perform control related to a communication path.

BACKGROUND ART

IP phone systems that convert voices, etc. into packet data, and transmit this packet data via an IP (Internet Protocol) net in real time are being used widely. With such an IP phone system, a plurality of IP phone terminals is accommodated by a switch of a local network realized by LAN (Local Area Network) or the like. In addition, at the same time, global networks such as a public network and the internet are connected with a local network via the router device of the local network.

Then, by the router device performing address conversion, etc., not only is communication between IP phone terminals of a local network being realized via a switch, but also communication between an IP phone terminal of a global network with an IP phone terminal of a local network is being realized.

In addition, with such an IP phone system, a NAT (Network Address Translator) function is built into the router device in order for the router device to perform address conversion, etc. Herein, NAT function is a function of converting the local address in sending to a global address and then sending as a sending source IP address, and then converting the global address of a destination IP address provided in receiving into a local address.

An example of such an IP phone system including a router with built-in NAT function is described in Patent Document 1. Patent Document 1 describes a system in which an SIP phone device based on SIP (Session Initiation Protocol) and a router are connected to LAN, and a telephone under the SIP phone device calls an SIP telephone connected to an ISP network, via the router and SIP phone device.

Further, Patent Document 1 has the object of solving a problem in that a small-scale telephone switching device such as a button telephone set (key telephone) that accommodates a plurality of phones and connects to a network cannot connect to a plurality of ISP networks with one telephone switching device.

In order to solve this problem, the technology described in Patent Document 1 configures so that one telephone device is able to mutually access each router via LAN by providing an external line port to each of a plurality of routers interfacing with corresponding ISP networks, respectively. The telephone device can thereby access with a corresponding ISP network via each router, in a call connection between SIP telephones via an external line from an extension telephone. For this reason, it is possible to communicate with a plurality of ISP networks, and thus possible to solve the aforementioned problem.

Patent Document 1: Japanese Unexamined Patent Application, Publication No. 2008-172552

DISCLOSURE OF THE INVENTION

Problems to be Solved by the Invention

As explained above, by employing the router with built-in NAT function described in Patent Document 1, etc. in an IP phone system, it becomes possible to perform communication between telephones installed in a global network on the WAN (Wide Area Network) side. However, with such a configuration, since a problem arises in that it becomes a router pathway, irrespective of calling within a local network, this problem will be explained below.

In a switch having an SIP server function installed in a local network, phone terminals installed in the local network, and phone terminals installed on the WAN side try to be accommodated. In this case, since the phone terminals installed in the local network are in the same network as the switch, there is essentially no need for sensing NAT. However, in the case of a phone terminal installed in a local network trying to establish a communication path through the switch with a phone terminal installed on the WAN side with peer to peer (hereinafter noted as "P2P"), the necessity arises for the phone terminal installed in the local network to sense NAT.

The reason thereof will be explained. If the IP address within SDP (Session Description Protocol in an Invite message sent from a phone terminal installed in the local network does not sense NAT, then usually the IP address of the local network will be set. Then, if the switch forwards to the phone terminal on the WAN side with the IP address remaining as the IP address of the local network, the phone terminal on the WAN side will not be able to recognize the IP address of the local network. For this reason, it will not be possible to establish a communication path by P2P. Therefore, the necessity arises for the phone terminals installed in a local network as mentioned above to sense NAT.

Therefore, in order to allow NAT to be sensed in a phone terminal installed in the local network, the phone terminal turns ON the NAT function possessed thereby. In addition thereto, in order to allow a registering switch to recognize as being the point traversing NAT, it is necessary to set the IP address of the switch to the IP address on the WAN side of the router.

As a result thereof, the phone terminals installed in the local network start operation sensing NAT. However, the aforementioned problem arises in trying to realize the operation of NAT also for calling between phone terminals installed in a local network, and becoming a router path irrespective of calling with the local network.

This problem will be explained more specifically by referencing the drawings.

FIG. 1 illustrates the configuration for explaining this problem. When referencing FIG. 1, the present example includes a first phone terminal 100, second phone terminal 200, third phone terminal 300, router 500 and STUN (Simple Traversal of User Datagram Protocol through Network Address Translators) server device 600.

A switch 400 is installed in a local network 800. In addition, the switch 400 has an SIP server function.

The first phone terminal 100 and second phone terminal 200 are installed in the same local network 800 as the switch 400. In addition, the first phone terminal 100 and second phone terminal 200 are extension registered in the switch 400.

The third phone terminal 300 has a global IP address, and is installed in the Internet 700. In addition, the third phone terminal 300 is extension registered in the switch 400.

The router 500 connects the Internet 700 and the local network 800. In addition, the STUN server device 600 is installed in the Internet 700.

With this configuration, it is considered to allow calling by P2P between the third phone terminal 300 installed in the Internet 700, and the first phone terminal 100 or second phone terminal 200 installed within the local network 800. For this reason, it is necessary for the first phone terminal 100 and second phone terminal 200 installed in the local network 800 to set each telephone so as to traverse the NAT of the router 500 connecting the local network 800 and Internet 700. In addition, it is necessary to set the settings of a static NAT table supplementing this in the router 500 in addition thereto.

In a state in which such setting is being made, in the case of allowing the first phone terminal 100 and second phone terminal 200 installed within the local network 800 to call by P2P, the RTP (Real-time Transport Protocol) packets used in this call will go through the router 500 for connecting between the Internet 700 and local network 800, as expressed in FIG. 1. For this reason, a wasteful load is imparted on the router 500 that is not in the communication by the shortest path. In other words, the aforementioned problem arises in coming to go through the router 500, despite being a call within the local network 800.

However, with a general IP phone system or the technology described in Patent Document 1, this point is not given any consideration.

Therefore, the present invention has the object of providing a communication path control device, communication path control system, communication path control method and communication path control program for performing communication with a communication path not going through relay devices such as a router unnecessarily.

Means for Solving the Problems

According to a first aspect of the present invention, a communication path control device is provided that, under an environment in which a first network and a second network are connecting via a relay device, in a case of information used for establishing of a communication path between a call-origin terminal and a call-destination terminal, sent by one among the call-origin terminal and the call-destination terminal to the other thereof, being forwarded from the relay device, overwrites contents of the information used for establishing of the communication path so that the communication path between the call-source terminal and call-destination terminal is established with a path not going through the relay device, and sends the information thus overwritten to the other one among the call-origin terminal and the call-destination terminal, if both of the network in which the call-origin terminal is installed and the network in which the call-destination terminal is installed are the first network.

According to a second aspect of the present invention, a communication path control system is provided that includes: the communication path control device provided by the first aspect of the present invention, the relay device, the call-source terminal, and the call-destination terminal, in which the relay device, the call-source terminal and the call-destination terminal perform communication based on NAT (Network Address Translator).

According to a third aspect of the present invention, a communication path control method is provided that includes, under an environment in which a first network and a second network are connecting via a relay device, in a case of information used for establishing of a communication path between a call-origin terminal and a call-destination terminal sent by one among the call-origin terminal and the call-destination terminal to the other thereof, being forwarded from the relay device, overwriting contents of the information used for establishing of the communication path so that the communication path between the call-source terminal and call-destination terminal is established with a path not going through the relay device, and sending the information thus overwritten to the other one among the call-origin terminal and the call-destination terminal, if both of the network in which the call-origin terminal is installed and the network in which the call-destination terminal is installed are the first network.

According to a fourth aspect of the present invention, a communication path control program is provided for enabling a computer to function as a communication path control device that, under an environment in which a first network and a second network are connecting via a relay device, in a case of information used for establishing of a communication path between a call-origin terminal and a call-destination terminal sent by one among the call-origin terminal and the call-destination terminal to the other thereof, being forwarded from the relay device, overwrites contents of the information used for establishing of the communication path so that the communication path between the call-source terminal and call-destination terminal is established with a path not going through the relay device, and sends the information thus overwritten to the other one among the call-origin terminal and the call-destination terminal, if both of the network in which the call-origin terminal is installed and the network in which the call-destination terminal is installed are the first network.

Effects of the Invention

According to the present invention, it becomes possible to perform communication with a communication path not going through relay devices such as a router unnecessarily.

BRIEF DESCRIPTION OF THE DRAWINGS

FIG. 3 is a view representing an example of a static NAPT table stored by a router in an embodiment of the present invention;

FIG. 4-1 is a sequence chart (1/2) representing the processing in a case of performing a call through NAT in the embodiment of the present invention;

FIG. 4-2 is a sequence chart (2/2) representing the processing in a case of performing a call through NAT in the embodiment of the present invention;

FIG. 5 is a view representing a terminal position management table example that is stored by the switch during a call through NAT in the embodiment of the present invention;

FIG. 6-1 is a sequence chart (1/2) representing the processing in a case of performing a call through NotNat in the embodiment of the present invention;

FIG. 6-2 is a sequence chart (2/2) representing the processing in a case of performing a call through NAT in the embodiment of the present invention; and FIG. 7 is a view representing a terminal position management table example stored by the switch during a call through the local network in the embodiment of the present invention.

EXPLANATION OF REFERENCE NUMERALS

Figure 1:
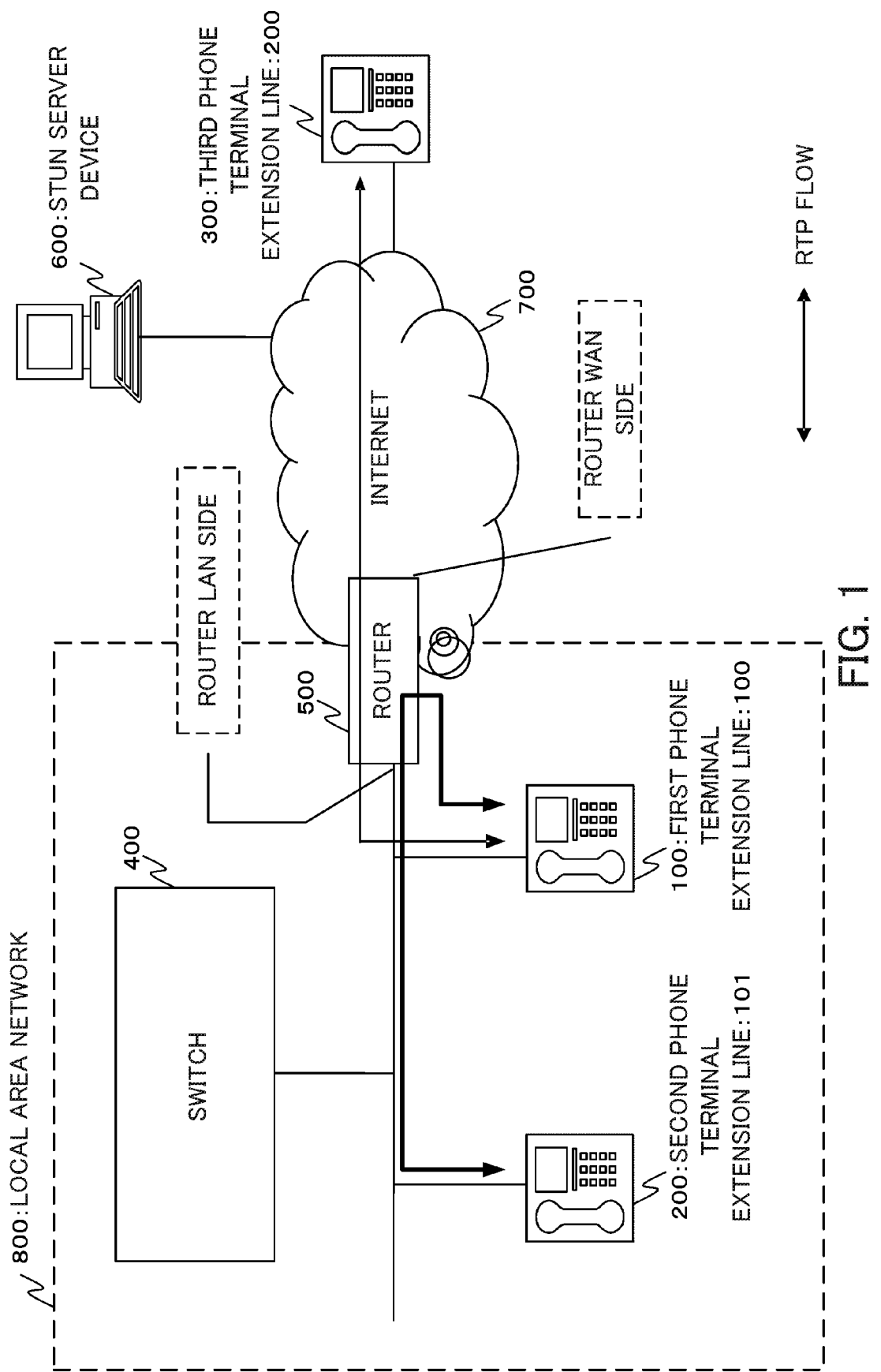
FIG. 1 is a block diagram illustrating the path of RTP packets in prior art.

10, 100 first phone terminal
20, 200 second phone terminal
30, 300 third phone terminal
40, 400 switch
50, 500 router
60, 600 STUN server device
70, 700 Internet
80, 800 local network

PREFERRED MODE FOR CARRYING OUT THE INVENTION

First, an outline of an embodiment of the present invention will be explained. In the embodiment of the present invention, a switch having an SIP server function controls so that the path of voice call packets between each terminal shortens, upon an SIP terminal installed within a local network 80 and an SIP terminal installed on the Internet coexisting in the switch having the SIP server function installed within the local network.

In such control, the switch determines whether the two terminals calling by the switch having the SIP server function are in the same network, or to realize a call through NAT. Then, based on the determination results, the switch 40 overwrites the IP address for establishing a communication path (e.g., calling path) in the SDP information included in the Invite message or 200 OK message sent from the phone terminal, with the IP address assigned to the phone terminal, or the global IP address assigned to the WAN side of the router, and sends to the terminal of the called party. It is thereby configured so as to control so that wasteful RTP packets do not go through the router, and the communication path transmitting call packets becomes shorter.

The above is an outline of the present embodiment.

Next, an embodiment of the present invention will be explained in detail by referencing the drawings.

Figure 2:
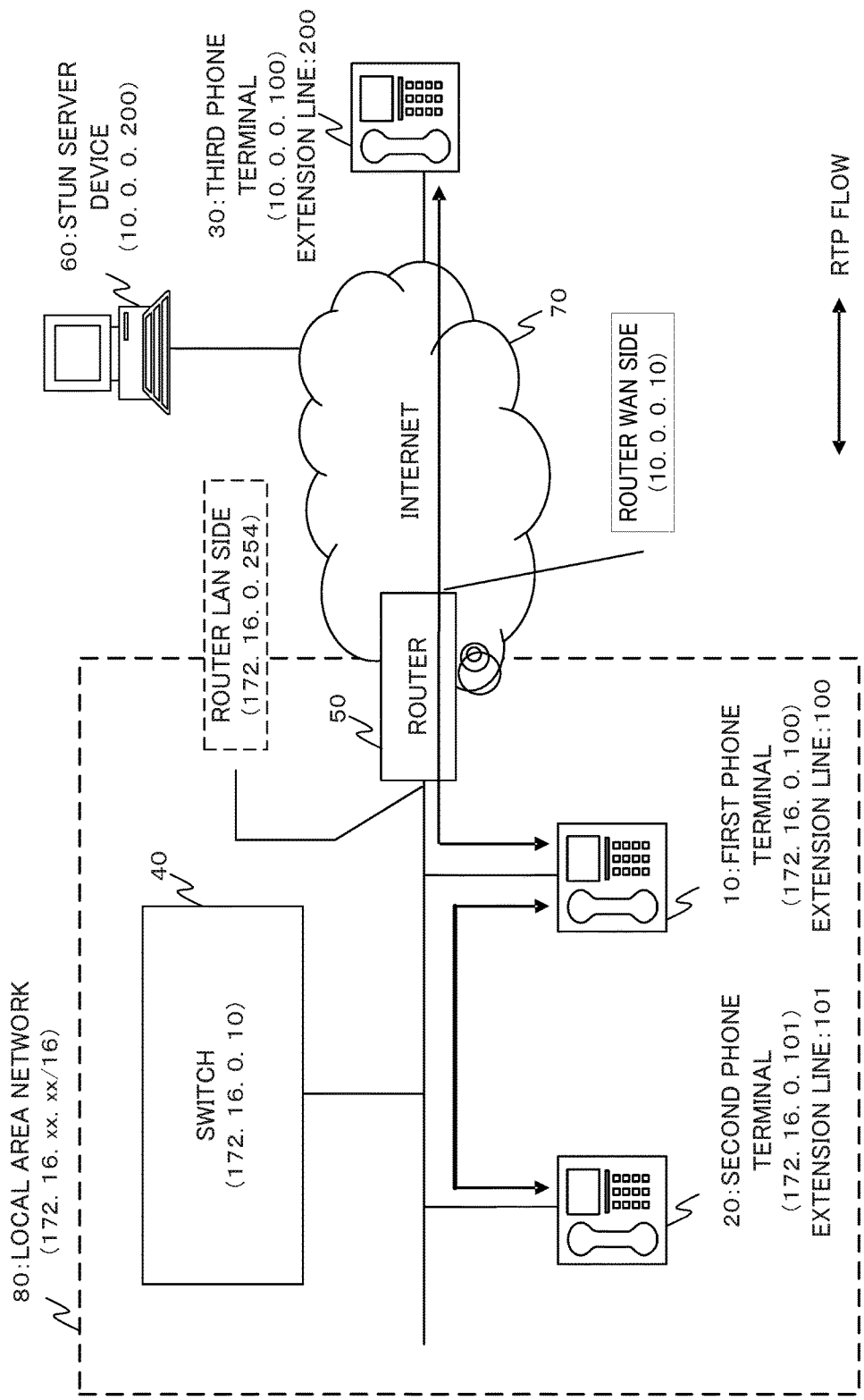
FIG. 2 is a block diagram representing a basic configuration of an embodiment of the present invention.

When referencing FIG. 2, the embodiment of the present invention includes a switch 40, first phone terminal 10, second phone terminal 20, third terminal 30, router 50 and STUN server device 60. In the present embodiment, each phone terminal shall perform voice communication by transmitting RTP packets based on SIP. It should be noted that, although the present example is a voice call, it may be configured to transmit data such as video.

Next, the respective forms of each of the devices included in the present embodiment will be explained. In addition, the IP address assigned as setting data of each of these devices and other setting information will also be explained. It should be noted that, in the drawings, the IP address assigned to each device noted by writing in parenthesis.

The switch 40 has an SIP server function, and can accommodate phone terminals as extension terminals. In addition, the switch 40 has the IP address 172.16.0.10 assigned thereto. Furthermore, the switch 40 has the IP address 172.16.0.254 on the LAN side of the router 50 set as the address of the default gateway. In addition, the switch 40 has the IP address on the WAN side of the router 50 required for traversing NAT set as 10.0.0.10. The switch 40 is set in the local network 80 of 172.16.xx.xx.

It should be noted that, although the switch 40 is illustrated with one functional block in the drawings, it may be configured to realize the switch 40 by a plurality of devices cooperating. In other words, it may be configured so as to realize the switch 40 as a system.

The first phone terminal 10 is installed in the same local network 80 as the switch 40, as well as the extension 100 and IP address 172.16.0.100 being assigned thereto. In addition, the first phone terminal 10 has 10.0.0.10 set as the IP address of the SIP server. Furthermore, the first phone terminal 10 implements a function based on STUN as the function for traversing NAT. Furthermore, the first phone terminal 10 has the address 10.0.0.200 of the STUN server device 60 set therein.

The second phone terminal 20 is installed in the same local network 80 as the switch 40, and the extension 101 and IP address 172.16.0.101 are assigned thereto. In addition, the second phone terminal 20 has 10.0.0.10 set as the IP address of the SIP server. Furthermore, the second phone terminal 20 implements a function based on STUN as the function for traversing NAT. Furthermore, the second phone terminal 20 has the address 10.0.0.200 of the STUN server device 60 set therein.

The third phone terminal 30 is installed on the Internet 70, and the extension 200 and global IP address 10.0.0.100 are assigned thereto. In addition, the third phone terminal 30 has 10.0.0.10 set as the IP address of the SIP server.

The router 50 is a device that connects the Internet 70 and local network 80. The router 50 has 172.16.0.254 assigned as the IP address on the LAN side, and 10.0.0.10 assigned as the IP address on the WAN side. In addition, this router 50 has a NAT function. The contents represented as Table 1 in FIG. 3 are set as a static NAPT table, and the packets received by the router 50 at port 5060 are forwarded according to this table.

The STUN server device 60 is installed on the Internet 70, and 10.0.0.200 is assigned as the IP address. To a STUN Request from each phone terminal, it has a function of returning a STUN Response made to include the global IP address assigned by NAT and port information to the router 50.

Next, operations upon performing a call between respective phone terminals of the present embodiment will be explained. In the following explanation, first, a case of the first phone terminal 10 performing an outgoing call to the third phone terminal 30, and performing a call through NAT between the first phone terminal 10 and third phone terminal 30 will be explained by referencing FIGS. 4-1, 4-2 and 5.

Next, a case of the first phone terminal 10 performing an outgoing call to the second phone terminal 20, and performing a call by the local network 80 without going through NAT, i.e. Not NAT, between the first phone terminal 10 and second phone terminal 20 will be explained by referencing FIGS. 6-1, 6-2 and 7.

Figures 1, 4:
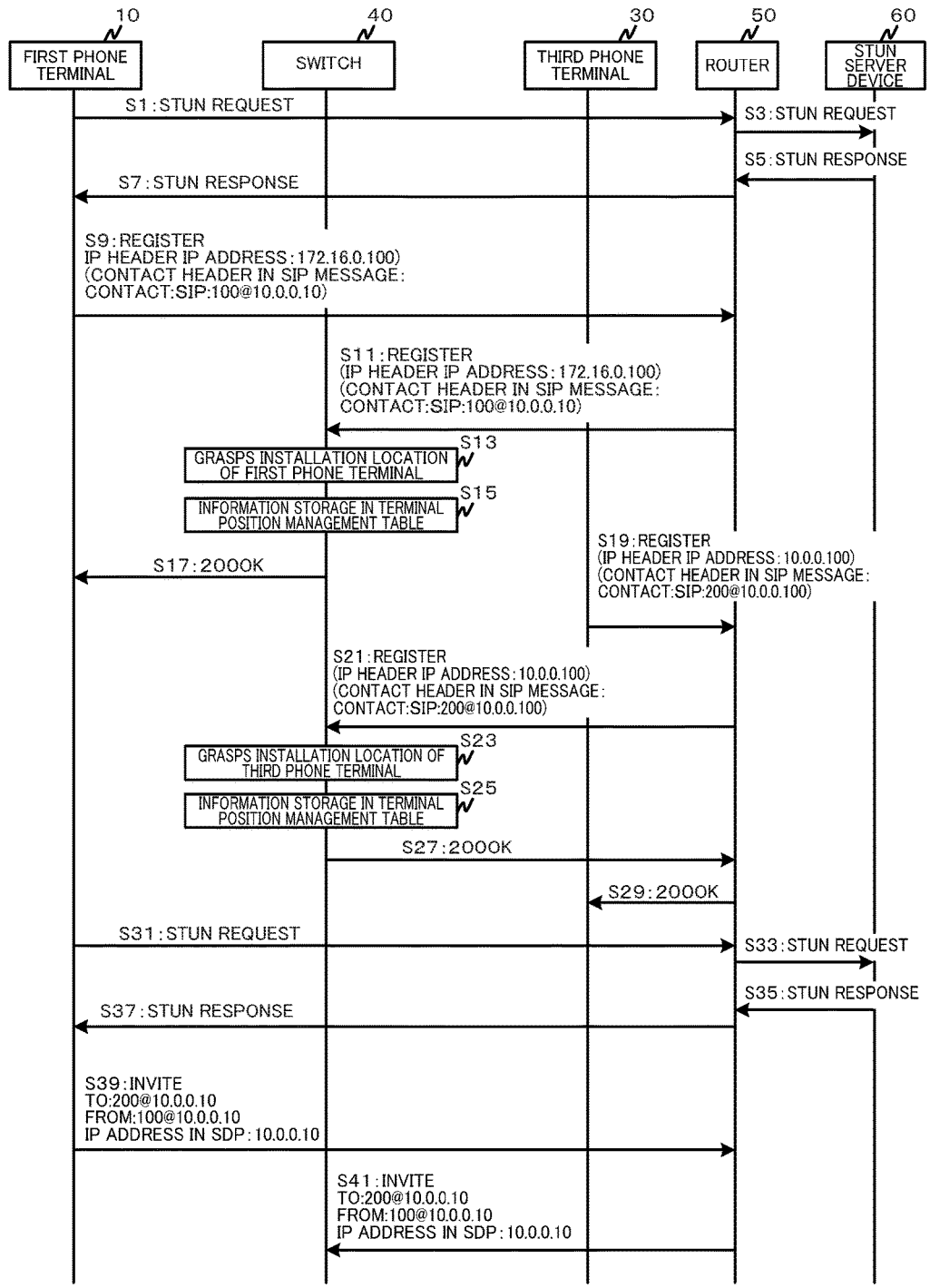
Figures 2, 4:
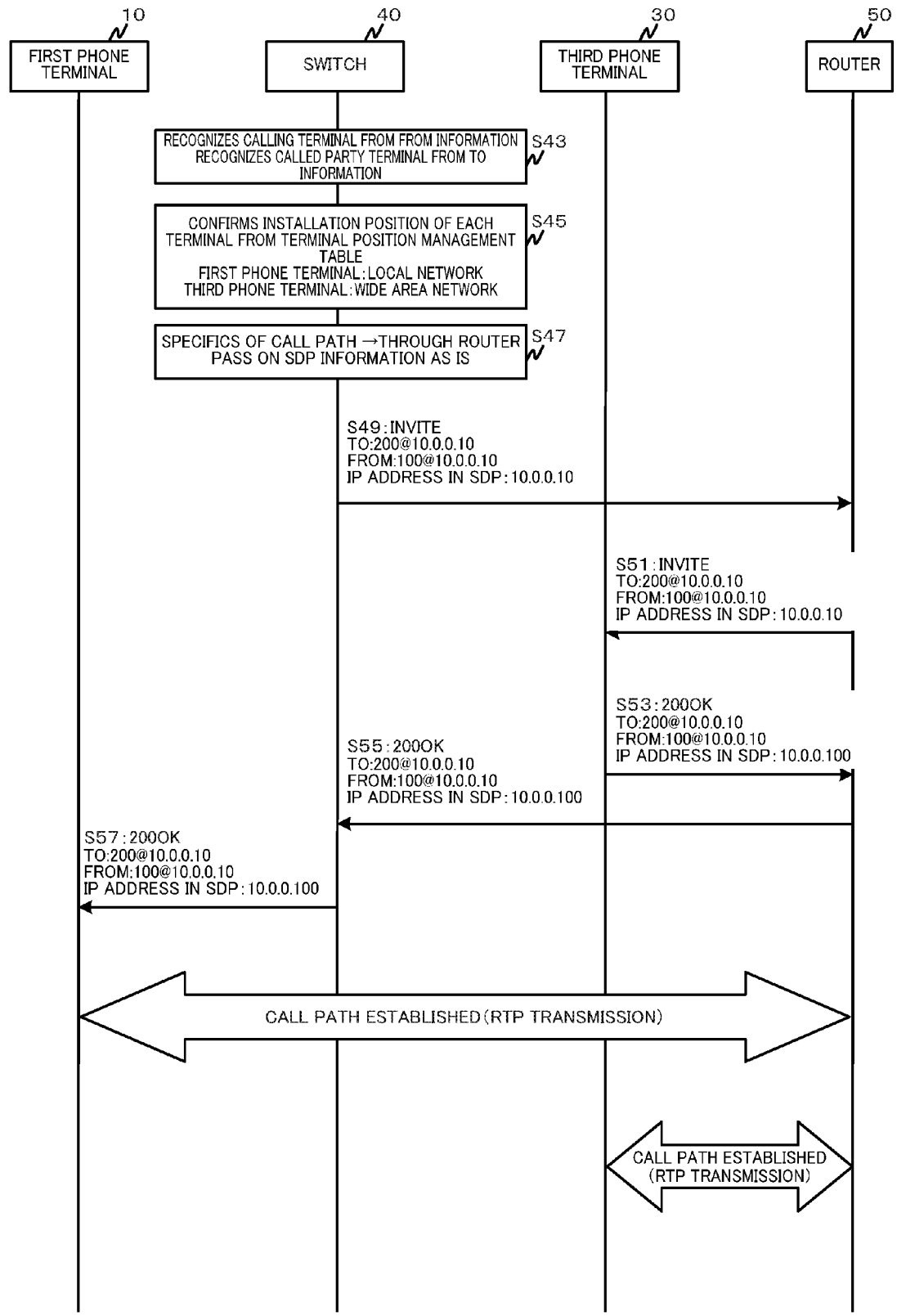

When referencing FIG. 4-1, first, the first phone terminal 10 sends a STUN Request packet to the STUN server device 60 in order to obtain the IP address 10.0.0.10 and port number 5060, which are the global IP address and port number assigned by NAT to the router 50 connecting the Internet 70 and local network 80 (Step S1). The router 50 forwards this STUN Request packet to the STUN server device 60 (Step S3).

The STUN server device 60 includes the global IP address and port number information assigned by NAT in the STUN Response message to the router 50, and the router 50 sending this STUN Response message to the first phone terminal 10 (Step S5) forwards this STUN Response message to the first phone terminal 10 (Step S7).

The first phone terminal 10 having received the STUN Response message acquires the global IP address and port number assigned by NAT to the router 50, creates a Register packet of the extension 100 using this information, and sends to the IP address 10.0.0.10 assigned on the WAN side of the router 50 (Step S9). It should be noted that the port number used in the present embodiment is assumed to be 5060, which is the standard port number in SIP. Herein, designation of the port number 5060 can be omitted according to the standardizing method; therefore, illustration and explanation are omitted as appropriate for the port number 5060. In addition, illustration and explanation is similarly omitted as appropriate in the following explanation.

The router 50 having received the Register message references the static NAPT table represented as Table 1 in FIG. 3. When this is done, as the forwarding destination IP address, 172.16.0.10 is stored, which is the local IP address assigned in the switch 40. In addition, the port number of the forwarding destination is assigned as 5060. Therefore, the router 50 forwards the Register message to the switch 40 (Step S11).

The switch 40 having received the Register message from the first phone terminal 10 via the router 50 acquires the IP address 172.16.0.100 of the sender from the IP header in the Register message received. In addition, the switch 40 acquires the IP address 10.0.0.10 and identifier 100 corresponding to the extension number from the SIP Contact header in the SIP message contained in the received Register message.

In addition, the switch 40 compares the IP address in the SIP Contact header of the first phone terminal 10 thus acquired, with the IP address 10.0.0.10 for traversing NAT set in the switch 40. Then, due to both matching, the switch 40 understands that the first phone terminal 10 is a phone terminal installed in the same local network 80 as the switch 40 (Step S13).

Furthermore, the switch 40 stores the respective acquired information in a terminal position management table represented as Table 2 in FIG. 5 (Step S15). When referencing this Table 2, for the first phone terminal 10, the extension number, IP address acquired from the IP header, and IP address acquired from the SIP Contact header are stored.

Next, the switch 40 sends a 200 OK message expressing that the first phone terminal 10 was registered based on the Register message from the first phone terminal 10, to the first phone terminal 10 (Step S17).

On the other hand, the third phone terminal 30 creates a Register packet of the extension 200 using the global IP address assigned to itself, and sends the Register message to the IP address 10.0.0.10 assigned to the WAN side of the router 50 (Step S19).

The router 50 having received the Register message references the static NAPT table represented as Table 1 in FIG. 3. When this is done, the IP address of the forwarding destination is stored as 172.16.0.10, which is the local IP address assigned to the switch 40. In addition, the port number of the forwarding destination is assigned as 5060. Therefore, the router 50 forwards the Register message to the switch 40 (Step S21). It should be noted that, since NAT conversion is performed during forwarding, it is converted to the IP address 172.16.0.254 of the sender in the IP header of the message.

The switch 50 having received the Register message from the third phone terminal 30 via the router 50 acquires the IP address 172.16.0.254 of the sender from the IP header of the received Register message. In addition, the switch 40 acquires the IP address 10.0.0.100 from the SIP Contact header in the SIP message contained in the received Register message.

Moreover, the switch 40 compares the IP address in the IP header of the third phone terminal 30 with the IP address 172.16.0.254 of the default gateway traversing NAT set in the switch 40. Then, since both are matching, the switch 40 understands that the third phone terminal 30 is a phone terminal installed in the WAN environment (Step S23).

Furthermore, the switch 40 stores the respective information acquired in the terminal position management table represented as Table 2 in FIG. 5 (Step S15). When referencing this Table 2, for the third phone terminal 30, the extension number, the IP address acquired from the IP header and the IP address acquired from the SIP Contact header are stored.

Next, the switch 40 sends a 200 OK message representing that the third phone terminal 30 was registered to the third phone terminal 30, based on the Register message from the third phone terminal 30 (Step S17).

By way of the above operations, the first phone terminal 10 and third phone terminal 30 are registered in the switch 40.

Next, operations upon the first phone terminal 10 performing an outgoing call to the third phone terminal 30 will be explained.

First, the user of the first phone terminal 10 dials the extension 200 using the first phone terminal 10. The first phone terminal 10 sends a STUN Request packet to the STUN server device 60 in order to obtain the IP address 10.0.0.10 and port number 5060, which are the global IP address and port number assigned by NAT to the router 50 for SIP session and RTP session (Step S31). The router 50 forwards this STUN Request packet to the STUN server device 60 (Step S33).

The STUN server device 60 includes the global IP address and port number information assigned by NAT to the router 50 in the STUN Response message, and the router 50 sending this STUN Response message to the first phone terminal 10 (Step S35) forwards this STUN Response message to the first phone terminal 10 (Step S37).

The first phone terminal 10 having received the STUN Response message acquires the global IP address and port number assigned by NAT to the router 50, and creates an Invite message to the extension 200 using this information.

The global IP address 10.0.0.10 is set in the IP address within the SDP information set in this Invite message.

The first phone terminal 10 sends the created Invite message to the IP address 10.0.0.10 assigned to the WAN side of the router 50.

The router 50 having received the Invite message references the static NAPT table represented as Table 1 in FIG. 3. When this is done, the forwarding destination IP address is stored as 172.16.0.10, which is the local IP address assigned to the switch 40. In addition, the forwarding destination port number 5060 is assigned. Therefore, the router 50 forwards the Invite message to the switch 40 (Step S41).

Next, the explanation is continued by referencing the sequence chart of FIG. 4-2. It should be noted that, since special processing is not performed by the STUN server device 60 in the processing explained by referencing FIG. 4-2, illustration of the STUN server device 60 is omitted from FIG. 4-2.

The switch 40 having received the Invite message from the first phone terminal 10 conducts analysis in the received message. First, the sending terminal is recognized as the first phone terminal 10 of extension 100 from the information of the From header. In addition, it is recognized that the called party is the third phone terminal 30 of extension 200 from the information of the To header. In addition, from the SDP information, it is recognized that the IP address that the first phone terminal 10 uses in order to establish a communication path for a call by way of RTP is 10.0.0.10 (Step S43).

The switch 40 having acquired this information first uses the terminal position management table represented as Table 2 in FIG. 5 to start consideration of at which position the terminal is installed that is the first phone terminal 10 of extension 100. More specifically, the switch 40 compares between the IP address 10.0.0.10 for traversing NAT set in the switch 40, and the IP address in the SIP Contact header of the first phone terminal 10 in the terminal position management table represented as Table 2 in FIG. 5. Then, since both are matching, the switch 40 understands that the first phone terminal 10 is a phone terminal installed in the same local network 80 as the switch 40.

Next, also for the third phone terminal 30 of extension 200 that is the called party, consideration of at which position the terminal is installed is started using the terminal position management table represented as Table 2 in FIG. 5. More specifically, the switch 40 compares the IP address in the IP header of the third phone terminal 30 with the IP address 172.16.0.254 of the default gateway traversing NAT set in the switch 40. Then, since both are matching, the switch 40 understands that the third phone terminal 30 is a phone terminal installed in the WAN environment (Step S45).

Herein, in the case of the first phone terminal 10 being a terminal of the local network 80, and the third phone terminal 30 being a WAN terminal, it is necessary to pass through the router 50 in order for both terminals to call. For this reason, it is not necessary to change the contents of the Invite message sent from the first phone terminal 10. Therefore, the switch 40 determines not to change the contents of the Invite message sent from the first phone terminal 10 (Step S47).

Then, the switch 40 forwards the Invite message sent from the first phone terminal 10 as is to the third phone terminal 30 (Step S49).

The router 50 having received the Invite message sent from the switch 40 conducts NAT conversion similarly to Step S21, and forwards to the third phone terminal 30 (Step S51).

The third phone terminal 30 having received the Invite message causes the ringtone to ring. In response thereto, the user of the third phone terminal 30 answers by taking the receiver off the hook, or the like. On the event of there being an answer, the third phone terminal 30 sends a 200 OK message including 10.0.0.100 in the SDP information to the IP address 10.0.0.10 assigned to the WAN side of the router 50 (Step S53).

The router 50 having received the 200 OK message references the static NAPT Table represented as Table 1 in FIG. 3. When this is done, the forwarding destination IP address is stored as 172.16.0.10, which is the local IP address assigned to the switch 40. In addition, the forwarding destination port number is assigned as 5060. Therefore, the router 50 forwards the 200 OK message to the switch 40 (Step S55).

Since the switch 40 having received the 200 OK message from the third phone terminal 30 determines not to change the contents of the message in Step S47, it forwards packets towards the first phone terminal 10 as is, without changing any of the contents of the 200 OK message (Step S57).

Subsequently, the first phone terminal 10 and third phone terminal 30 send RTP to the IP address destination written in SDP. By the router 50 forwarding this RTP, it is possible to establish a communication path for voice communication by P2P through the router 50.

Next, a case of the first phone terminal 10 performing an outgoing call to the second phone terminal 20, and performing a call between the first phone terminal 10 and second phone terminal 20 by the local network 80, without going through NAT, i.e. Not NAT, will be explained by referencing FIGS. 6-1, 6-2 and 7.

Figures 1, 6:
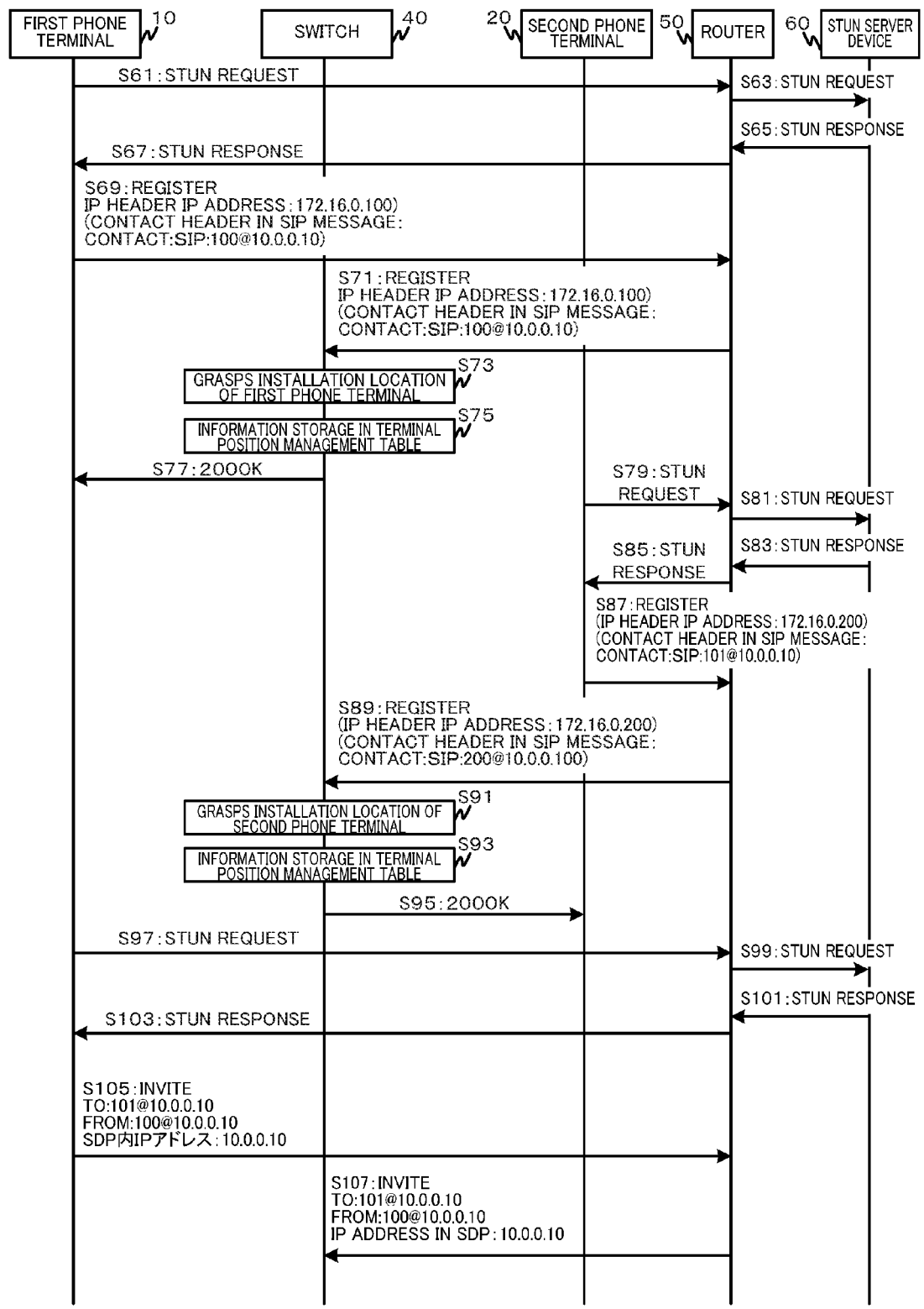
Figures 2, 6:
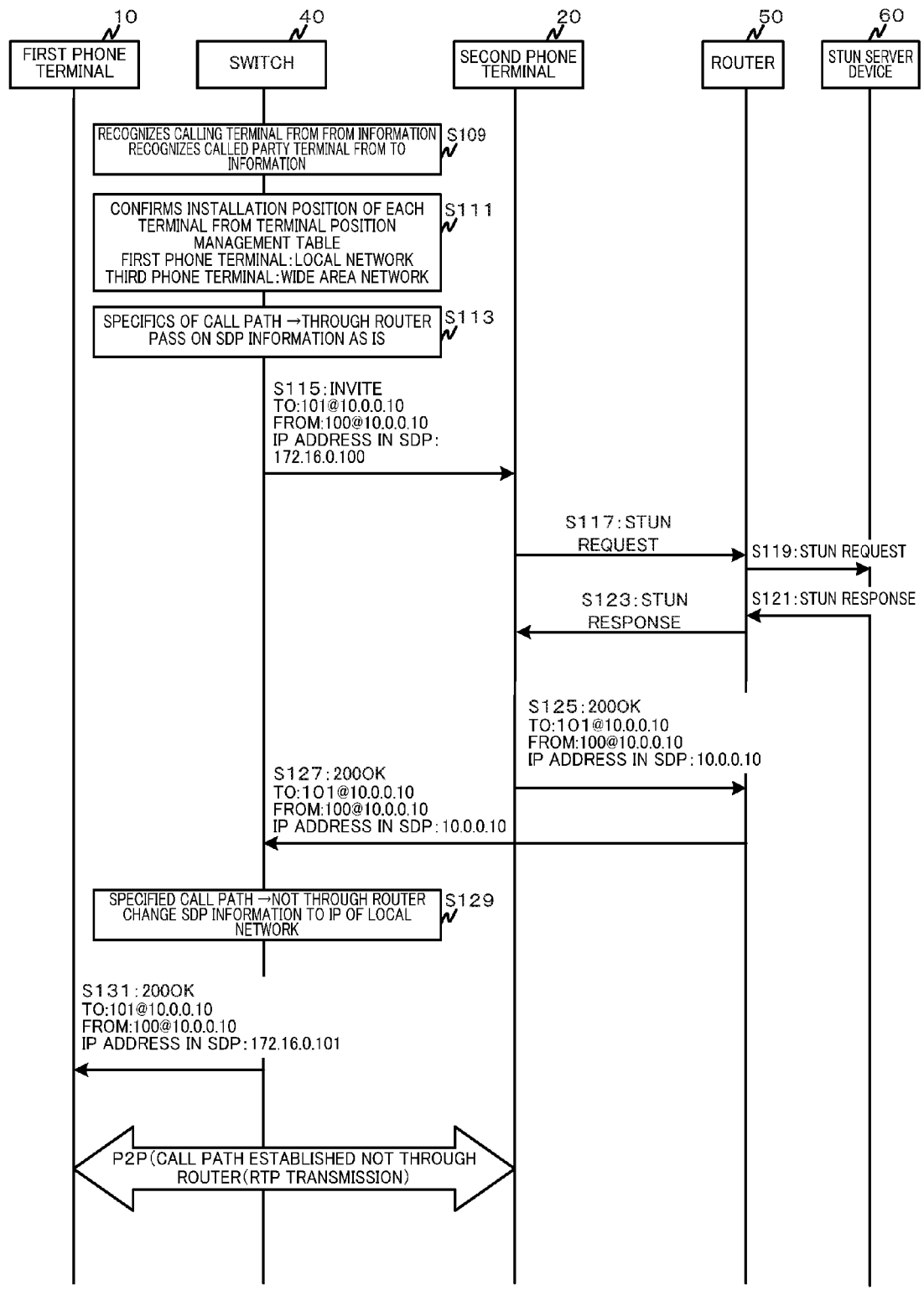

Herein, the processing of Steps S61 to S77 in FIG. 6-1, which are operations for registration of the first phone terminal 10, are the same as the aforementioned processing of Steps S1 to S17; therefore, explanation thereof will be omitted. However, although the information of the first phone terminal 10 is stored in the terminal position management table represented as Table 2 in FIG. 5 in Step S15, the information of the first phone terminal 10 shall be stored in the terminal position management table represented as Table 3 in FIG. 7 in Step S75.

The second phone terminal 20 sends a STUN Request packet to the STUN server device 60 in order to obtain the IP address 10.0.0.10 and port number 5060, which are the global IP address and port number assigned by NAT to the router 50 connecting the Internet 70 and local network 80 (Step S79). The router 50 forwards this STUN Request packet to the STUN server device 60 (Step S81).

The STUN server device 60 includes the global IP address and port number information assigned by NAT to the router 50 in the STUN Response message, and the router 50 sending this STUN Response message to the second phone terminal 20 (Step S83) forwards this STUN Response message to the second phone terminal 20 (Step S85).

The second phone terminal 20 having received the STUN Response message acquires the global IP address and port number assigned by NAT to the router 50, creates a Register packet of extension 100 using this information, and sends to the IP address 10.0.0.10 assigned to the WAN side of the router 50 (Step S87).

The router 50 having received the Register message references the static NAPT table represented as Table 1 in FIG. 3. When this is done, the forwarding destination IP address is stored as 172.16.0.10, which is the local IP address assigned to the switch 40. In addition, the forwarding destination port number is assigned as 5060. Therefore, the router 50 forwards the Register message to the switch 40 (Step S89).

The switch 40 having received the Register message from the second phone terminal 20 via the router 50 acquires the IP address 172.16.0.101 of the sender from the IP header in the received Register message. In addition, the switch 40 acquires the IP address 10.0.0.10 and the identifier 101 corresponding to the extension number from the SIP Contact header in the SIP message included in the received Register message.

In addition, the switch 40 compares the IP address in the SIP Contact header of the second phone terminal 20 acquired, with the IP address 10.0.0.10 for traversing NAT set in the switch 40. Then, since both are matching, the switch 40 understands that the second phone terminal 20 is a phone terminal installed in the same local network 80 as the switch 40 (Step S91).

Furthermore, the switch 40 stores the acquired respective information in the terminal position management table represented as Table 3 in FIG. 7 (Step S93). Then, when referencing FIG. 3, for the second phone terminal 20, the extension number, the IP address acquired from the IP header and the IP address acquired from the SIP Contact header are stored.

Next, the switch 40 sends the 200 OK message, representing that the second phone terminal 20 was registered, to the second phone terminal 20, based on the Register message from the second phone terminal 20 (Step S95).

According to the above operations, the first phone terminal 10 and second phone terminal 20 are registered in the switch 40.

Next, operations upon the first phone terminal 10 performing an outgoing call to the second phone terminal 20 will be explained.

First, the user of the first phone terminal 10 dials to the extension 101 using the first phone terminal 10. The first phone terminal 10 sends a STUN Request packet to the STUN server device 60 in order to obtain the IP address 10.0.0.10 and port number 5060, which are the global IP address and port number assigned by NAT to the router 50 for SIP session and RTP session (Step S97). The router 50 forwards this STUN Request packet to the STUN server device 60 (Step S99).

The STUN server device 60 includes the global IP address and port number information assigned by NAT to the router 50 in the STUN Response message, and the router sending this STUN Response message to the first phone terminal 10 (Step S101) forwards this STUN Response message to the first phone terminal 10 (Step S103).

The first phone terminal 10 having received the STUN Response message acquires the global IP address and port number assigned by NAT to the router 50, and creates an Invite message to the extension 101 using this information. The global IP address 10.0.0.10 is set as the IP address in the SDP information set within this Invite message.

The first phone terminal 10 sends the created Invite message to the IP address 10.0.0.10 assigned to the WAN side of the router 50 (Step S105).

The router 50 having received the Invite message references the static NAPT table represented as Table 1 in FIG. 3. When this is done, the forwarding destination IP address is stored as 172.16.0.10, which is the local IP address assigned to the switch 40. In addition, the forwarding destination port number is assigned as 5060. Therefore, the router 50 forwards the Invite message to the switch 40 (Step S107).

Next, the explanation will be continued by referencing the sequence chart of FIG. 6-2.

The switch 40 having received the Invite message from the first phone terminal 10 conducts analysis in the received message. First, the sending terminal is recognized as the first phone terminal 10 of extension 100 from the information of the From header. In addition, it is recognized that the called party is the second phone terminal 20 of extension 101 from the information of the To header. In addition, it is recognized from the SDP information that the IP address which the first phone terminal 10 uses in order to establish a communication path for a call by way of RTP is 10.0.0.10 (Step S109).

The switch 40 having acquired this information first starts consideration of at which position the terminal is installed that is the first phone terminal 10 of extension 100, using the terminal position management table represented as Table 3 in FIG. 7. More specifically, the switch 40 compares between the IP address 10.0.0.10 for traversing NAT set in the switch 40, and the IP address of the SIP Contact header of the first phone terminal 10 in the terminal position management table represented as Table 3 in FIG. 7. Then, since both are matching, the switch 40 understands that the first phone terminal 10 is a phone terminal installed in the same local network 80 as the switch 40.

Next, also for the second phone terminal 20 of extension 101 that is the called party, consideration of at which position the terminal is installed is started using the terminal position management table represented as Table 3 in FIG. 7. More specifically, the switch 40 compares between the IP address 10.0.0.10 for traversing NAT set in the switch 40, and the IP address of the SIP Contact header of the second phone terminal 20 in the terminal position management Table represented as Table 3 in FIG. 7. Then, since both are matching, the switch 40 understands that the second phone terminal 20 is a phone terminal installed in the same local network 80 as the switch 40.

By configuring in this way, the switch 40 recognizes that the first phone terminal 10 is a terminal of the local network 80, and the second phone terminal 20 is also a terminal of the local network 80 (Step S111).

In this case, the first phone terminal 10 and second phone terminal 20 may send RTP by the communication path established between local networks 80, and do not require going through the router 50. However, if the IP address in SDP of the Invite message sent from the first phone terminal 10 were forwarded as is, the RTP sent by the established communication path would go through the router 50.

Therefore, the switch 40 converts the IP address 10.0.0.10 within SDP of the Invite message sent from the first phone terminal 10 into the IP address 172.16.0.100 of the IP header registered in the terminal position management table represented as Table 3 in FIG. 7 (Step S113). This IP address 172.16.0.100 is the IP address in the local area network of the first phone terminal 10.

Then, the switch 40 forwards the converted Invite message to the second phone terminal 20 (Step S115).

The second phone terminal 20 having received the Invite message causes the ringtone to ring. In response thereto, the user of the second phone terminal 20 answers by taking the receiver off the hook, or the like. On the event of there being an answer, the second phone terminal 20 sends a STUN Request packet to the STUN server device 60 for obtaining the IP address 10.0.0.10 and port number 5060, which are the global IP address and port number assigned by NAT to the router 50 for SIP session and RTP session (Step S117). The router 50 forwards this STUN Request packet to the STUN server device 60 (Step S119).

The STUN server device 60 includes the global IP address and port number information assigned by NAT to the router 50 in the STUN Response message, and the router 50 sending this STUN Response message to the second phone terminal 20 (Step S121) forwards this STUN Response message to the second phone terminal 20 (Step S123).

The second phone terminal 20 having received the STUN Response message acquires the global IP address and port number assigned by NAT to the router 50, and creates a 200 OK message to the extension 200 using this information.

The global IP address 10.0.0.10 is set as the IP address in the SDP information set within this 200 OK message.

The first phone terminal 10 sends the created 200 OK message to the IP address 10.0.0.10 assigned to the WAN side of the router 50 (Step S125).

The router 50 having received the 200 OK message references the static NAPT table represented as Table 1 in FIG. 3. When this is done, the forwarding destination IP address is stored as 172.16.0.10, which is the local IP address assigned to the switch 40. In addition, the forwarding destination port number is assigned as 5060. Therefore, the router 50 forwards the 200 OK message to the switch 40 (Step S127).

The switch 40 having received the 200 OK message from the second phone terminal 20 determines to change the contents of the message in Step S113. For this reason, the IP address 10.0.0.10 of the SDP information in the 200 OK message is converted to the IP header IP address 172.16.0.101 registered in the terminal position management table represented as Table 3 in FIG. 7 (Step S129). Then, the 200 OK message in which the IP address was converted is forwarded to the first phone terminal 10.

Thereafter, the first phone terminal 10 and second phone terminal 20 send RTP to the IP address written in SDP. Herein, the IP address written in SDP is the IP address in the local network 80 of the partner-side telephone overwritten by the switch 40 in Step S113 and Step S129. For this reason, the first phone terminal 10 and second phone terminal 20 establish a communication path for voice communication by P2P, and it becomes possible to transmit RTP without going through the router 50.

As explained above, the switch 40 having a built-in SIP server function recognizes in which networks the terminals are installed for both terminals calling in the present embodiment, and the switch 40 overwrites the IP address for establishing a communication path as necessary. It is thereby possible to control an RTP session that would have gone through the router 50 so as not to go through the router 50, and thus it becomes possible to establish RTP without routing wasteful traffic to the router 50.

It should be noted that each of the respective devices included in the above-mentioned embodiment can be realized by hardware, software of a combination thereof. In addition, the communication path control method performed by each device included in the above-mentioned embodiment can also be realized by hardware, software or a combination thereof. Herein, to be realized by software indicates the matter of being realized by a computer reading and executing a program.

The program is stored using various types of non-transitory computer readable media, and can be supplied to the computer. The non-transitory computer readable media includes various types of tangible storage media. Examples of non-transitory computer readable media include magnetic media (e.g., flexible disks, magnetic tape, hard disk drives), magneto-optical media (e.g., magneto-optical disk), CD-ROM (Read Only Memory), CD-R, CD-R/W, semiconductor memory (e.g., mask ROM, PROM (Programmable ROM), EPROM (Erasable PROM), flash ROM, and RAM (random access memory)).

In addition, although the aforementioned embodiment is a preferred embodiment of the present invention, it is not to limit the scope of the present invention to only the above-mentioned embodiment, and it is also possible to implement in forms achieved by conducting various modifications within a scope not departing from the gist of the present invention.

For example, the number, etc. of phone terminals included in the present embodiment can be set to any number.

In addition, in the aforementioned Step S13, etc., the switch 40 compared between the IP address 10.0.0.10 for traversing NAT set in the switch 40 and the IP address in the SIP Contact header of the first phone terminal 10 or second phone terminal 20 acquired. Then, in the case of both matching, the switch 40 understood that the first phone terminal 10 or second phone terminal 20 was a phone terminal installed in the same local network 80 as the switch 40.

Without configuring in this way, it may be configured so as to compare between the IP address 172.16.0.254 of the default gateway traversing NAT set in the switch 40 and the IP address in the IP header of the first phone terminal 10 or second phone terminal 20, and in the case of both being different IP addresses, understanding that the first phone terminal 10 or second phone terminal 20 is a phone terminal installed in the same local network 80 as the switch 40.

In addition, in the aforementioned Step S23, etc., the switch 40 compared between the IP address 172.16.0.254 of the default gateway traversing NAT set in the switch 40 and the IP address in the IP header of the third phone terminal 30, and due to both matching, understood that the third phone terminal 30 was a phone terminal installed in the WAN environment.

Without configuring in this way, it may be configured so as to compare between the IP address 10.0.0.10 for traversing NAT set in the switch 40 and the IP address in the SIP Contact header of the third phone terminal 30 acquired, and due to both differing, understand that the third phone terminal 30 is a phone terminal installed in the WAN environment.

The present application is based on Japanese Patent Application No. 2015-096964 (filed on May 13, 2015), and claims the benefit of priority based on Japanese Patent Application No. 2015-097964. The entire disclosure of Japanese Patent Application No. 2015-097964 is incorporated in the present disclosure by reference to Japanese Patent Application No. 2015-097964.

Although representative embodiments of the present invention are described in detail, it should be understood that various changes, substitutions and alternatives may be made without departing from the spirit or scope of the invention defined in the claims. In addition, even assuming that claims were amended in application prosecution, the applicant's intention is that an equivalent scope of the claimed invention is maintained.

A part or the entirety of the above-mentioned embodiments can be described as in the following additional notations; however, they are not to be limited to the following.

(Additional Notation 1) A communication path control device is characterized in that, under an environment in which a first network and a second network are connecting via a relay device, in a case of information used for establishing of a communication path between a call-origin terminal and a call-destination terminal, sent by one among the call-origin terminal and the call-destination terminal to the other thereof, being forwarded from the relay device, overwrites contents of the information used for establishing of the communication path so that the communication path between the call-source terminal and call-destination terminal is established with a path not going through the relay device, and sends the information thus overwritten to the other one among the call-origin terminal and the call-destination terminal, if both of the network in which the call-origin terminal is installed and the network in which the call-destination terminal is installed are the first network.

(Additional Notation 2) In the communication path control device as described in Additional Notation 1, in a case of forwarding the information for establishing of the communication path from the relay device under a similar environment as said environment, the communication path control device does not overwrite contents of the information used for establishing of the communication path so that the communication path between the call-source terminal and call-destination terminal is established with a path through the relay device, and sends the information not overwritten to the other one among the call-origin terminal and the call-destination terminal, if the network in which the call-origin terminal is installed and the network in which the call-destination terminal is installed are different networks.

(Additional Notation 3) In the communication path control device as described in Additional Notation 1 or 2, in a case of a terminal installed in the first network being the call-origin terminal, the information used for establishing of the communication path includes an address of the relay device on a side of the second network, even if the call-destination terminal is either terminal among a terminal installed in the first network and a terminal installed in the second network.

(Additional Notation 4) In the communication path control device as described in Additional Notation 3, the overwriting includes overwriting the address of the relay device on the side of the second network included in the information used for establishing of the communication path, with an address of the call-origin terminal or the call-destination terminal in the first network.

(Additional Notation 5) In the communication path control device as described in any one of Additional Notation 1 to 4, in a case of the terminal installed in the first network being the call-origin terminal, the information used for establishing of the communication path includes a sending-source address and the address of the relay device on the side of the second network as an address in a Contact header based on SIP (Session Initiation Protocol), even if the call-destination terminal is either terminal of a terminal installed in the first network and a terminal installed in the second network, and the overwriting includes overwriting the address in the Contact header with the address of the call-origin terminal or the call-destination terminal in the first network.

(Additional Notation 6) In the communication path control device as described in any one of Additional Notation 1 to 5, the device compares between an address used by the terminal installed in the first network for sending information to the terminal installed in the second network through the relay device, and an address in a Contact header based on SIP (Session Initiation Protocol) included in the information used for establishing of the communication path, and in a case of both addresses matching, determines that the terminal having sent the information used for establishing of the communication path is the terminal installed in the first network.

(Additional Notation 7) In the communication path control device as described in any one of Additional Notation 1 to 6, the device compares between an address used for sending information by the terminal installed in the second network to the terminal installed in the first network through the relay device and a sending-source address included in the information used for establishing of the communication path, and in a case of both addresses matching, determines that the terminal having sent the information used for establishing of the communication path is the terminal installed in the second network.

(Additional Notation 8) In the communication path control device as described in any one of Additional Notations 1 to 7, sends information received from the call-source terminal and the call-destination terminal prior to forwarding the information used for establishing the communication path from the relay device, and identifies a network in which the call-source terminal and the call-destination terminal are installed based on the information thus received and the information used for establishing of the communication path.

(Additional Notation 9) The communication path control device as described in any one of Additional Notations 1 to 8, the first network is a local network in which the switch is installed, and the second network is the Internet in which the STUN server device is installed.

(Additional Notation 10) A communication path control system, comprises the communication path control device as described in any one of Additional Notation 1 to 9, the relay device, the call-source terminal, and the call-destination terminal, in which the relay device, the call-source terminal and the call-destination terminal perform communication based on NAT (Network Address Translator).

(Additional Notation 11) In the communication path control system as described in Additional Notation 10, the relay device is a router, and an address on a side of the first network and an address on a side of the second network are assigned to the router.

(Additional Notation 12) In the communication path control system as described in Additional Notation 10 or 11, the communication path control device is a switch, and the call-source terminal and the call-destination terminal establish a communication path using the communication path control device that is the switch.

(Additional Notation 13) In the communication path control system as described in any one of Additional Notations 10 to 12, the call-source terminal and the call-destination terminal are phone terminals, and the call-source terminal and the call-destination terminal establish a communication path based on information used for establishing of the communication path, and transmit RTP (Real-time Transport Protocol) packets via the communication path thus established.

(Additional Notation 14) In a communication path control device, a switch with built-in SIP server function recognizes in which network both calling terminals are installed, and the switch overwrites an IP address for establishing a communication path as necessary.

(Additional Notation 15) A communication path control method comprises, under an environment in which a first network and a second network are connecting via a relay device, in a case of information used for establishing of a communication path between a call-origin terminal and a call-destination terminal sent by one among the call-origin terminal and the call-destination terminal to the other thereof, being forwarded from the relay device, overwriting contents of the information used for establishing of the communication path so that the communication path between the call-source terminal and call-destination terminal is established with a path not going through the relay device, and sending the information thus overwritten to the other one among the call-origin terminal and the call-destination terminal, if both of the network in which the call-origin terminal is installed and the network in which the call-destination terminal is installed are the first network.

(Additional Notation 16) A communication path control program for enabling a computer to function as a communication path control device that, under an environment in which a first network and a second network are connecting via a relay device, in a case of information used for establishing of a communication path between a call-origin terminal and a call-destination terminal sent by one among the call-origin terminal and the call-destination terminal to the other thereof, being forwarded from the relay device, overwrites contents of the information used for establishing of the communication path so that the communication path between the call-source terminal and call-destination terminal is established with a path not going through the relay device, and sends the information thus overwritten to the other one among the call-origin terminal and the call-destination terminal, if both of the network in which the call-origin terminal is installed and the network in which the call-destination terminal is installed are the first network.

INDUSTRIAL APPLICABILITY

The present invention is suited to communication systems accompanying communication between a plurality of networks.

The invention claimed is:

1. A communication path control device in a network system in which a first network and a second network are connecting via a relay device, the communication path control device; comprising:
at least one memory configured to store instructions; and
at least one processor configured to execute the stored instructions to:
determine a communication path between a call-origin terminal and a call-destination terminal using information forwarded from the relay device, the information being sent by a first terminal among the call-origin terminal and the call-destination terminal to a second terminal among the call-origin terminal and the call-destination terminal,
compare between a first address used by a terminal installed in the first network for sending information to a terminal installed in the second network through the relay device and a second address which is included in a Contact header based on SIP (Session Initiation Protocol), the Contact header being included in the information being used to determine a communication path between a call-origin terminal and a call-destination terminal,
determine, in a case that the first address and the second address are same, that the terminal having sent the information being used to determine a communication path between a call-origin terminal and a call-destination terminal is a terminal installed in the first network,
overwrite, when both of the call-origin terminal and the call-destination terminal are terminals installed in the first network, contents of the forwarded information so that the communication path between the call-origin terminal and the call-destination terminal is established with a path not going through the relay device, and
send the forwarded information thus overwritten to the second terminal among the call-origin terminal and the call-destination terminal.

2. The communication path control device according to claim 1, wherein the at least one processor is further configured to execute the instructions to:
compare between a first address used by a terminal installed in the second network for sending information to a terminal installed in the first network through the relay device and a source address which is included in the information used to determine a communication path between a call-origin terminal and a call-destination terminal, and
determine, in a case that the first address and the source address are same, that the terminal having sent the information used to determine a communication path is a terminal installed in the second network.

3. The communication path control device according to claim 2, wherein the at least one processor is further configured to execute the stored instructions to,
in a case where the device determines one terminal as a terminal installed in the first network, store and link the terminal's extension number and information which indicates that the terminal is installed in the first network, and
in a case where the device determines one terminal as a terminal installed in the second network, store and link the terminal's extension number and information which indicates that the terminal is installed in the second network, and
identify a network where the call-origin terminal and the call-destination terminal are installed on the basis of the stored information and the extension number of the call-origin terminal and the extension number of the call-destination terminal included within information which is used to determine a communication path between the call-origin terminal and the call-destination terminal.

4. The communication path control device according to claim 1, wherein, in a case that the information used to determine a communication path is forwarded from the relay device,
the at least one processor is further configured to execute the instructions to not overwrite, when the call-origin terminal and the call-destination terminal are terminals installed in different networks, contents of the information used to determine, a communication path between a call-origin terminal and a call-destination terminal, and configured to send the information not overwritten to the second terminal among the call-origin terminal and the call-destination terminal.

5. The communication path control device according to claim 1, wherein, in a case that a terminal installed in the first network is the call-origin terminal,
the information used to determine a communication path includes an address of the relay device on a side of the second network, even if the call-destination terminal is either terminal among a terminal installed in the first network and a terminal installed in the second network.

6. The communication path control device according to claim 1, wherein the overwriting includes overwriting, with an address of the terminal of the call-origin terminal or the call-destination terminal in the first network, the address of the relay device on the side of the second network included in the information used to determine a communication path.

7. The communication path control device according to claim 1, wherein, in a case that the terminal installed in the first network is the call-origin terminal,
the information used to determine a communication path includes a source address and the address of the relay device on the side of the second network as an address in information based on SDP (Session Description Protocol), even if the call-destination terminal is either of a terminal installed in the first network and a terminal installed in the second network, and wherein the overwriting includes overwriting, with the address of the call-origin terminal or the call-destination terminal in the first network, the address in information based on the SDP.

8. A communication path control system comprising the communication path control device according to claim 1, the relay device, the call-origin terminal, and the call-destination terminal, wherein the relay device, the call-origin terminal and the call-destination terminal perform communication based on NAT (Network Address Translator).

9. A communication path control method in a communication path control device of a network system in which a first network and a second network are connecting via a relay device, the communication path control method comprising:

determining a communication path between a call-origin terminal and a call-destination terminal using information forwarded from the relay device, the information being sent by a first terminal among the call-origin terminal and the call-destination terminal to a second terminal among the call-origin terminal and the call-destination terminal, comparing between a first address used by a terminal installed in the first network for sending information to a terminal installed in the second network through the relay device and a second address which is included in a Contact header based on SIP (Session Initiation Protocol), the Contact header being included in the information being used to determine a communication path between a call-origin terminal and a call-destination terminal, determining, in a case that the first address and the second address are same, that the terminal having sent the information being used to determine a communication path between a call-origin terminal and a call-destination terminal is a terminal installed in the first network, overwriting, when both of the call-origin terminal and the call-destination terminal are terminals installed in the first network, contents of the forwarded information so that the communication path between the call-origin terminal and the call-destination terminal is established with a path not going through the relay device, and sending the forwarded information thus overwritten to the second terminal among the call-origin terminal and the call-destination terminal.

10. The non-transitory computer readable medium storing a communication path control program for enabling a computer to function as a communication path control device in a network system in which a first network and a second network are connecting via a relay device, causing the computer to execute instructions to:

determine a communication path between a call-origin terminal and a call-destination terminal using information forwarded from the relay device, the information being sent by a first terminal among the call-origin terminal and the call-destination terminal to a second terminal among the call-origin terminal and the call-destination terminal, compare between a first address used by a terminal installed in the first network for sending information to a terminal installed in the second network through the relay device and a second address which is included in a Contact header based on SIP (Session Initiation Protocol), the Contact header being included in the information being used to determine a communication path between a call-origin terminal and a call-destination terminal, determine, in a case that the first address and the second address are same, that the terminal having sent the information being used to determine a communication path between a call-origin terminal and a call-destination terminal is a terminal installed in the first network, overwrite, when both of the call-origin terminal and the call-destination terminal are terminals installed in the first network, contents of the forwarded information so that the communication path between the call-origin terminal and the call-destination terminal is established with a path not going through the relay device, and send the forwarded information thus overwritten to the second terminal among the call-origin terminal and the call-destination terminal.

* * * * *